US006895213B1

(12) United States Patent
Ward

(10) Patent No.: US 6,895,213 B1
(45) Date of Patent: May 17, 2005

(54) SYSTEM AND METHOD FOR COMMUNICATING WITH STUDENTS IN AN EDUCATION ENVIRONMENT

(75) Inventor: Darrell L. Ward, Denton, TX (US)

(73) Assignee: Einstruction Corporation, Denton, TX (US)

( * ) Notice: Subject to any disclaimer, the term of this patent is extended or adjusted under 35 U.S.C. 154(b) by 185 days.

(21) Appl. No.: 10/004,949

(22) Filed: Dec. 3, 2001

(51) Int. Cl.[7] ............................................... G09B 3/00
(52) U.S. Cl. ....................... 434/350; 434/322; 434/118; 345/700
(58) Field of Search ............................. 434/322, 350, 434/118; 345/700, 705, 710, 859

(56) References Cited

U.S. PATENT DOCUMENTS

| 3,245,157 A | 4/1966 | Laviana ............................ 35/9 |
| 3,416,243 A | 12/1968 | Greenberg et al. ............... 35/48 |
| 3,676,939 A | 7/1972 | Oberst et al. ................. 35/48 R |
| 3,699,667 A | 10/1972 | Gomez .......................... 35/9 B |
| 3,762,072 A | 10/1973 | From ........................... 35/48 R |
| 4,055,906 A | 11/1977 | Thompson .................... 35/9 A |
| 4,715,818 A * | 12/1987 | Shapiro et al. .............. 434/118 |
| 4,764,120 A * | 8/1988 | Griffin et al. ................ 434/336 |
| 5,002,491 A | 3/1991 | Abrahamson et al. ....... 434/322 |
| 5,226,177 A | 7/1993 | Nickerson ....................... 455/2 |
| 5,273,437 A * | 12/1993 | Caldwell et al. ............. 434/351 |
| 5,344,326 A | 9/1994 | Ferris ........................... 434/336 |
| 5,379,213 A | 1/1995 | Derks ........................... 364/411 |
| 5,537,141 A | 7/1996 | Harper et al. ................... 348/12 |
| 5,586,889 A * | 12/1996 | Goodman ..................... 434/327 |
| 5,724,357 A * | 3/1998 | Derks ........................... 370/313 |
| 5,736,984 A | 4/1998 | Jellinek et al. ............... 345/710 |
| 5,788,508 A * | 8/1998 | Lee et al. ..................... 434/350 |
| 5,823,788 A * | 10/1998 | Lemelson et al. ........... 434/350 |
| 5,827,070 A | 10/1998 | Kershaw et al. ............. 434/322 |
| 5,842,869 A | 12/1998 | McGregor et al. ........... 434/201 |
| 5,842,871 A | 12/1998 | Cutler et al. ................. 434/335 |
| 6,021,119 A | 2/2000 | Derks et al. .................. 370/261 |
| 6,039,575 A * | 3/2000 | L'Allier et al. .............. 434/323 |
| 6,086,381 A | 7/2000 | Downs et al. ................ 434/322 |
| 6,112,049 A * | 8/2000 | Sonnenfeld ................... 434/350 |
| 6,164,974 A | 12/2000 | Carlile et al. ................ 434/322 |
| 6,173,154 B1 | 1/2001 | Kucinski et al. ............. 434/359 |
| 6,181,910 B1 | 1/2001 | Jerrold-Jones et al. ...... 434/353 |
| 6,208,832 B1 | 3/2001 | Remschel .................... 434/350 |
| 6,288,753 B1 | 9/2001 | DeNicola et al. ............ 348/586 |
| 6,289,222 B1 | 9/2001 | Cue et al. .................... 455/458 |
| 6,302,698 B1 * | 10/2001 | Ziv-El ......................... 434/323 |
| 6,704,541 B1 * | 3/2004 | Ciarallo et al. .............. 434/362 |

* cited by examiner

*Primary Examiner*—Xuan M. Thai
*Assistant Examiner*—Cameron Saadat
(74) *Attorney, Agent, or Firm*—Baker Botts L.L.P.

(57) ABSTRACT

A communication system for communicating with students in an education environment includes a plurality of remote units, a base station that receives messages from the remote units, a processor, a memory, and a display simultaneously visible to all users of the remote units. The base station receives a response to a current question from a remote unit. The processor determines whether the current response is a valid response, and uses the display to visually indicate to a user of the remote unit whether the response is valid.

41 Claims, 4 Drawing Sheets

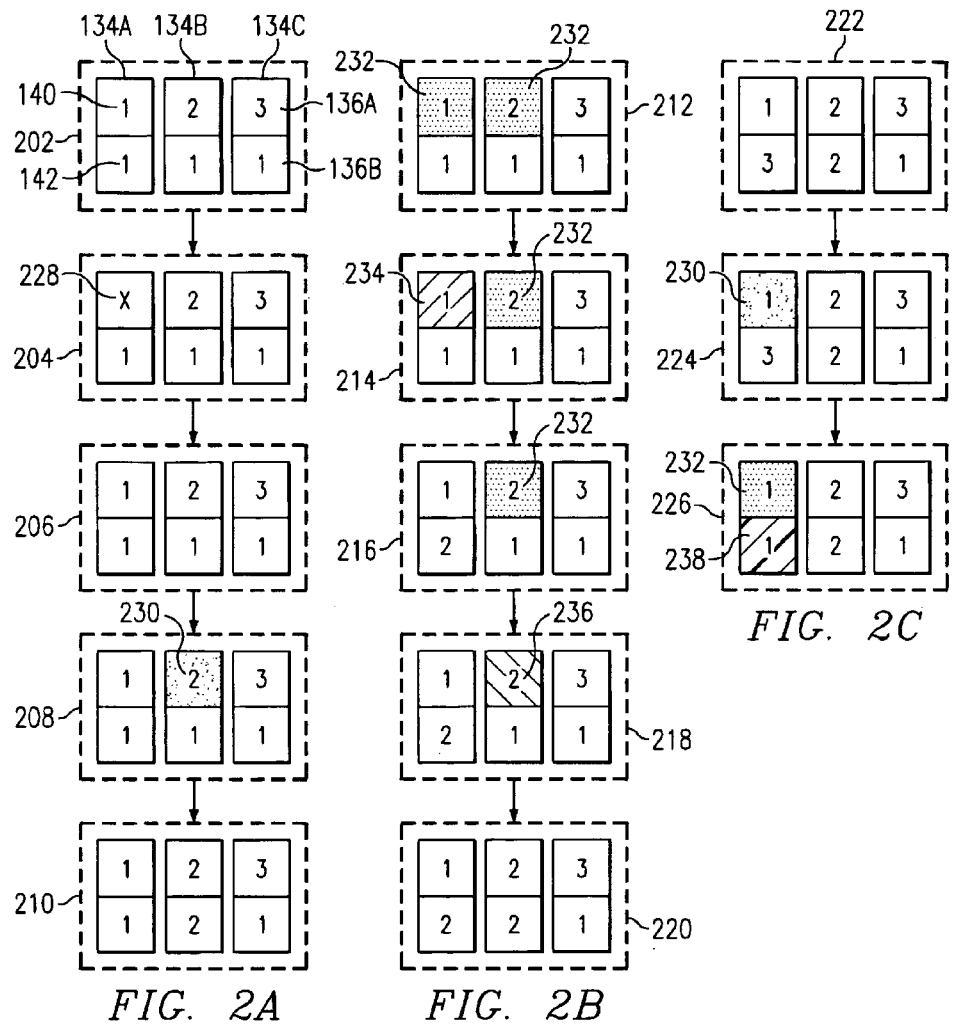

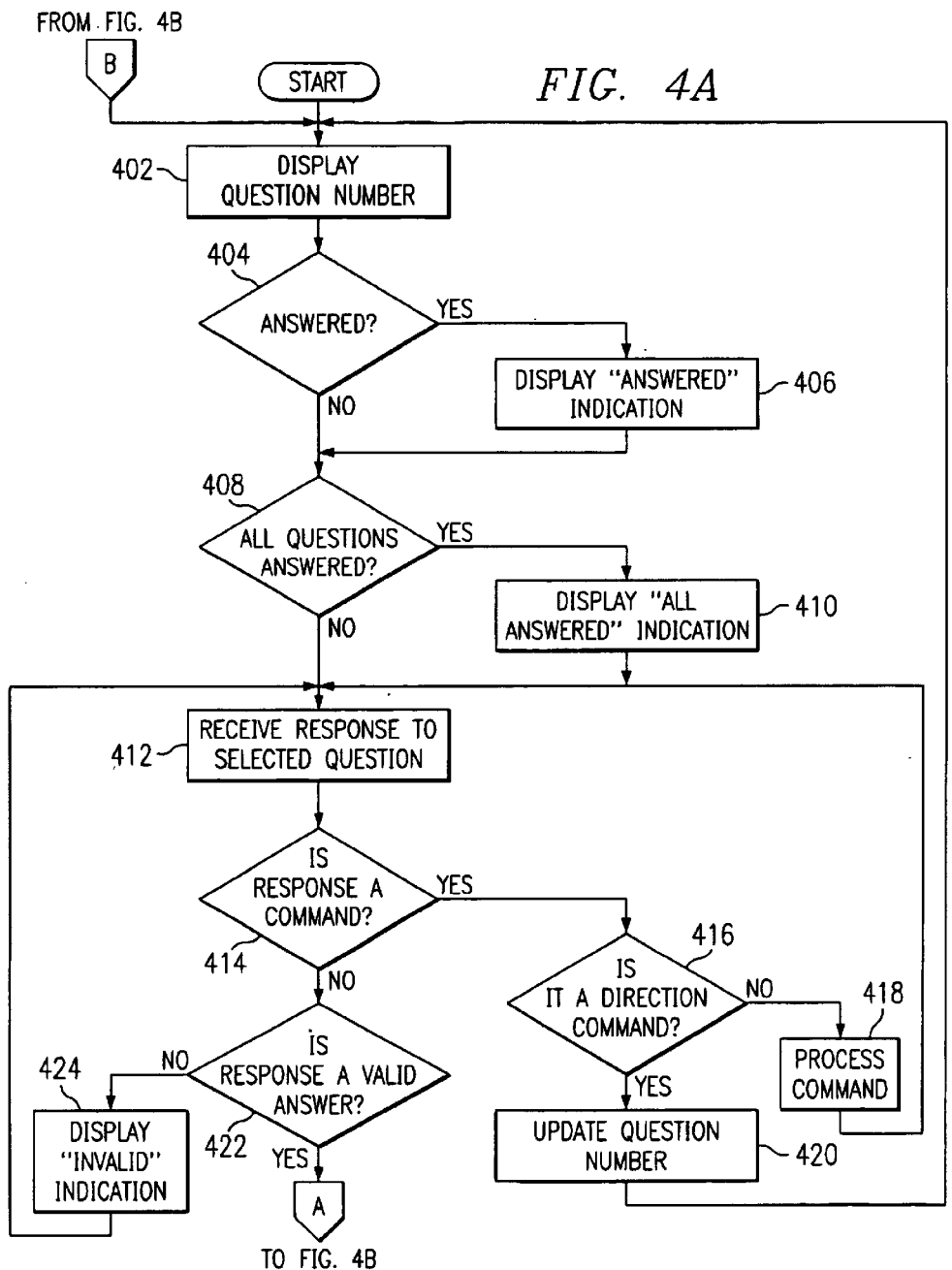

SYSTEM AND METHOD FOR COMMUNICATING WITH STUDENTS IN AN EDUCATION ENVIRONMENT

TECHNICAL FIELD OF THE INVENTION

The present invention relates generally to communication systems for education, and more particularly to a method and system for communicating with students in an education environment.

BACKGROUND OF THE INVENTION

Incorporation of technology into the classroom has been an increasing trend in recent years. Communication systems allow teachers to provide more information to, and receive more feedback from, their students. However, technology has yet to be fully integrated into many traditional classroom areas such as administering examinations. This incomplete integration reduces the overall efficiency of the education process.

SUMMARY OF THE INVENTION

In accordance with the present invention, techniques for communicating with students in an education environment are disclosed. In a particular embodiment, a communication system receives responses in the form of wireless signals from remote units.

In a particular embodiment of the present invention, a method for communicating in an education environment includes determining a current question having a plurality of possible answers and receiving from a remote unit a message which includes a remote unit identifier and a response to the current question. The method also includes determining whether the current response from the remote unit is a valid response matching a possible answer for the selected question. The method further includes visually indicating to a user of the remote unit whether the response is valid or not.

In another embodiment of the present invention, a communication system includes a plurality of remote units, a base station operable to receive messages from the remote units, a processor, a memory and a display simultaneously viewable by the users of the remote units. The memory stores a plurality of possible answers to a plurality of questions. The base station receives messages from the remote units, each message including a remote unit identifier and a current response. The processor determines a current question for each message, and determines whether the current response is valid. The display visually indicates to the users of the remote units whether their respective current responses are valid.

In yet another embodiment of the present invention, a graphical user interface includes a plurality of sections, each section displaying a respective remote unit identifier for a remote unit. Each section includes a first visible indication that can be displayed when a current response received from the remote unit is not a valid response corresponding to a possible answer to a question. Each section also includes a second visible indication that can be displayed when the current response received from the remote unit is a valid response, and no previous response to the question has been received from the remote unit. Each section also includes third and fourth visible indications which can be displayed when a previous answer has been received from the remote unit, and the current response either does or does not match the previous response respectively.

Embodiments of the present invention provide various technical advantages. An important technical advantage of certain embodiments of the present invention is a display simultaneously viewable by all of the users of the remote units of the system. The display visually indicates to each user that the user's response was valid or invalid. This allows a large number of students to respond to questions using only one display, saving the expense of individual displays for each student.

Another technical advantage of certain embodiments is the use of wireless response units. This allows greater flexibility in administration of the examination, and provides advantages such as reduced cheating, ease of administration, and savings of educational resources.

Another technical advantage of certain embodiments of the present invention is asynchronous test administration. This feature allows an examination to be administered through a communication system such that users of a remote units can give responses to different questions during the examination and move from question to question independently. For example, one student might be answering question one, while another is answering question three. Alternatively, a teacher may perform a synchronous examination, which allows the teacher to control the pace and flow of questions.

Yet another technical advantage of certain embodiments of the present invention is the ability of the system to instantly grade responses received from remote units. In a particular embodiment, a communication system can determine that a complete set of valid responses has been received from a remote unit, and then compare the complete set of responses to a set of correct answers. From this comparison, the communication system can determine a score for the complete set of responses rapidly without requiring a teacher to perform the grading.

Additional technical advantages of the present invention will be readily apparent to one skilled in the art. While specific advantages have been enumerated above, various embodiments of the present invention may include all, some, or none of the enumerated advantages. The features and technical advantages of the present invention may be better understood by reference to the following figures, description, and claims.

BRIEF DESCRIPTION OF THE DRAWINGS

For a more complete understanding of the present invention and its advantages, reference is now made to the following description, taken in conjunction with the accompanying drawings, in which:

FIGS. 2A–2C illustrate examples of a graphical user interface in the communication system;

FIG. 3 is an exemplary table storing responses received from a remote unit in the communication system.

DETAILED DESCRIPTION OF THE INVENTION

Figure 1:
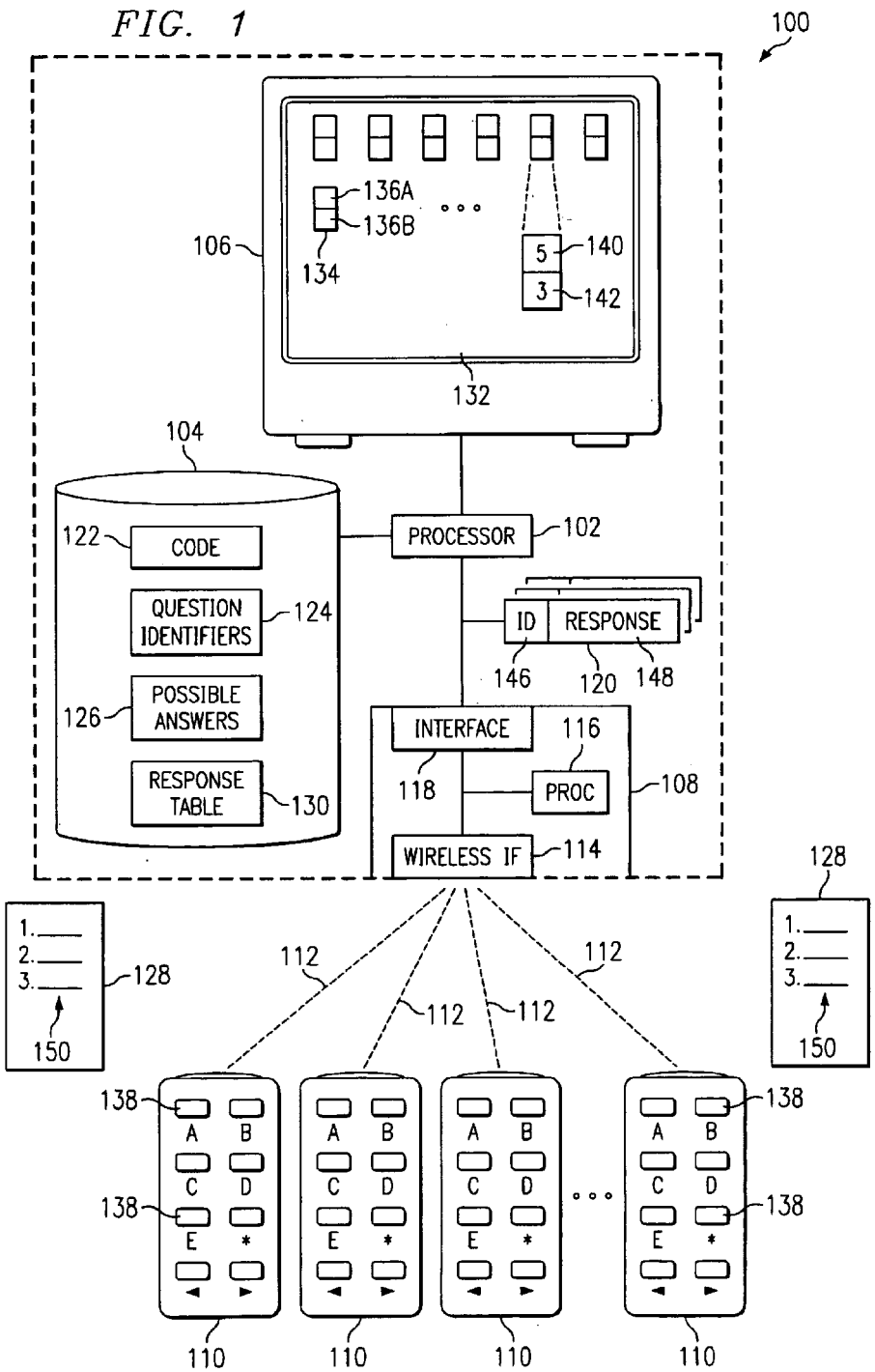
FIG. 1 illustrates a communication system in accordance with the present invention.

FIG. 1 illustrates a communication system 100 including a processor 102, a memory 104, a display 106, a base station 108, and a plurality of remote units 110. Communication system 100 allows users to send messages using remote units 110 and to receive visible indication associated with the messages on display 106, typically in an education environment. An "education environment" may be a traditional classroom environment, but may also include a meeting, a focus group, or any other gathering in which an instructor or moderator seeks responses from the group.

Processor 102 controls the operation of system 100. Processor 102 may include microprocessors, microcontrollers, or any other suitable combination of hardware and/or software that processes information and manages components of system 100. In a particular embodiment, processor 102 is the CPU of a personal computer. In another embodiment, processor 102 is distributed among components of system 100.

Memory 104 may be any type of memory, volatile or nonvolatile, local or remote, suitable for storing information. Memory 104 may include magnetic media, optical media, CD-ROMs, DVD-ROMs, removable media, or any other suitable form of storage. Memory 104 stores code 122 executed by processor 102 to control the overall operation of system 100. Memory 104 also stores question identifiers 124 corresponding to questions 150, possible answers 126 to questions 150, and a response table 130 for storing responses from users of system 100.

Each question identifier 124 is associated with one of the questions 150. Questions 150 comprise any inquiry to be posed to users of remote units 110. Questions 150 may be provided to users in a preprinted form 128, displayed on display 106, or conveyed to users in any other suitable form. Questions 150 may be identified in a numeric sequence. System 100 may store questions 150 in memory 104. In a particular embodiment, each remote unit 110 can respond to a different question 150 and the sets of questions 150 can be different for each user.

Possible answers 126 include any suitable responses to questions 150. In a particular embodiment, possible answers 126 include letters to respond to a multiple choice question. Possible answers 126 typically are some form of alphanumeric response to questions 150, and may vary from question to question. Alternative forms of response include audio responses, selection of answers from a touch-sensitive screen, or any other suitable answer to question 150 that might be submitted by remote unit 110. System 100 may also designate one or more possible answers 126 as correct answers for questions 150 to facilitate automatic grading.

Code 122 represents a set of instructions executed by processor 102. Code 122 may be any form of logic, hard-wired instructions, hardware, and/or software. Code 122 processes responses and determines a current question 150 for each remote unit 110. In some embodiments, code 122 allows a user of remote unit 110 to navigate through questions 150.

Response table 130 stores responses from remote units 110. Response table 130 includes any suitable arrangement of information relating responses from remote units 110 to possible answers 126 and to question identifiers 124, such as a table, a database, an array or any other format or arrangement of information. In a particular embodiment, response table 130 may include pointers that indicate a current question 150 such that a response received from a particular remote unit 110 will be stored as a response to that question 150. Response table 130 may also include a flag indicating when a remote unit has submitted a response to all questions 150.

Display 106 displays information to users of remote units 110. Display 106 may include a monitor, a projection screen, a television screen, or any other suitable method for visually displaying information. Display 106 may be a single display simultaneously visible to all users of remote units 110. In some embodiments, display 106 includes a graphical user interface (GUI) 132. GUI 132 may be divided into sections 134, each with a first portion 136 and a second portion 138. First portion 136 displays an identifier 140 corresponding to one of remote units 110, while second portion 138 displays a question number 142 for a current question 150 for which a response is expected from remote unit 110. Display 106 can display a wide variety of information that might be useful to users, including questions 150, status information for a particular question 150, and even responses to questions 150.

Base station 108 receives signals from remote units 110. In a particular embodiment, base station 108 may include a wireless interface 114, a processor 116, and a computer interface 118. Wireless interface 114 includes an antenna, detector or other suitable component to receive wireless signals 112 from remote units 110 and to convert the wireless signals 112 into messages. Processor 116 includes a microprocessor, a microcontroller, or any other suitable arrangement of hardware and/or software usable to process information. Processor 116 handles routing of messages received from remote units 110, including moving or rerouting messages, requesting resubmission, rejecting messages during high traffic periods, or performing any other suitable routing function. Processor 116 also reformats messages into a suitable form. Processor 116 communicates messages from base station 108 to processor 102 via interface 108. Interface 108 may include any port or connection, real or virtual, that allows base station 108 to communicate messages to processor 102. Although base station 108 has been shown as a wireless system, it is understood that base station 108 may also receive any type of suitable messages from remote units 110, including electromagnetic signals over wires, light-based signals, audio signals, or any other suitable method for conveying information from remote unit 110 to base station 108. In such alternative embodiments, wireless interface 114 would take the form of any appropriate interface 114 for the type of message received.

Remote units 110 include any suitable devices for sending messages to base station 108. In a particular embodiment, the user of remote unit 110 pushes one of several buttons 144 on remote unit 110, and remote unit 110 generates a wireless signal in response. Alternative embodiments of remote unit 110 may include a touch-sensitive display, a microphone for receiving audio input, or any other suitable method for user to enter information in remote unit 110. Various embodiments may include buttons 144 that are alphanumeric, symbolic (e.g., asterisks, question marks, arrows), color-coded, or otherwise distinctively marked.

In operation, processor 102 determines a current question 150 for each remote unit 110. The current question 150 may be the same for all remote units 110, referred to as "synchronous operation," or may be different for different remote units 110, referred to as "asynchronous operation." In a particular embodiment, during asynchronous operation, the user of remote unit 110 may be able to select a new question 150 using remote unit 110. An identifier 142 associated with the current question 150 is typically displayed on display 106 so that the user of each remote unit 110 will know which question 150 has been selected for that remote unit 110.

A user of remote unit 110 submits a response to the current question 150 by pressing button 144 on remote unit 110. Remote unit 110 generates a message in response to button 144 being pressed and communicates the message as signal 112. User of remote unit 110 may generally select from a wide variety of responses. For example, user may select one of the possible answers 126 for question 150. Alternatively, user may issue a command to select a new question 150 for remote unit 110. User might also inadvertently press a button 144 which is neither a possible answer 126 nor a command 128, in which case system 100 gives appropriate notification to user that an invalid answer has been given, as described in detail below.

Base station 108 receives signals 112 from remote units 110 through interface 114. In a particular embodiment, when multiple signals 112 arrive in a short time interval, processor 116 accepts the first signal 112 and rejects the rest. Processor 116 may also send a message to remote units 110 using interface 114. For example, processor 116 can confirm that signal 112 was received by base station 108. Using information in signals 112, processor 116 interprets signal 112 as a message 120. Message 120 typically includes an identifier 146 for one of the remote units 110, as well as a response 148 sent by the remote unit 110 corresponding to a button 144 selection on remote unit 110. Processor 116 sends messages 120 to other components of system 100 using interface 118.

Processor 102 compares message 120 to possible answers 126 to the current question 150 for the remote unit 110 that sent message 120. In a particular embodiment, processor 102 determines whether a previous response to question 150 has been stored in response table 130. Processor 102 may also determine that response 148 is a command, and take appropriate action responsive to the command.

Processor 102 then displays an appropriate visual indication to user on display 106. For example, if the response 148 does not correspond to a possible answer 126, then processor 102 may cause GUI 132 to display an indication that an invalid answer has been given. If response 148 is a command, processor 102 may appropriately update display 106 by updating question identifier 142.

If response 148 corresponds to one of the possible answers 126 for question 150, processor 102 may display an appropriate indication that a valid answer has been given on display 106. In a particular embodiment, the type of indication may depend on whether a previous answer has been given to question 150. In a particular embodiment, GUI 132 displays a first visible indication if response 148 is valid and no previous response has been submitted to question 150. GUI 132 displays a second visible indication if response 148 is valid and corresponds to a previous response stored in response table 130. GUI 132 displays a third visible indication if response 148 is valid, but does not correspond with a previous answer stored in response table 130. Processor 102 stores valid responses in response table 130. Upon receiving a valid response, processor 102 automatically increments to the next question 150 in a sequence of questions 150 and displays the identifier 142 for the new question 150 on display 106.

In certain embodiments, processor 102 may monitor the progress of the user of each remote unit 110 on questions 150. Once processor 102 receives a complete set of valid responses, processor 102 may compare responses in response table 130 to a set of correct answers to determine a score for the complete set.

FIGS. 2A–2C show frames illustrating displays of a particular embodiment of GUI 132. In particular, GUI 132 includes sections 134 corresponding to users of remote units 110. Each section 134 includes a first portion 136 and a second portion 138. First portion 136 shows a remote unit identifier 140 corresponding to a particular remote unit 110. Second portion 138 shows a question identifier 142 corresponding to a number for a current question 150. Frame 202 shows a possible initial display for system 100. In this initial display for three users, the question identifier 142 for each remote unit 110 corresponds to the first question 150. In a particular embodiment, portions 136 and 138 of each section 134 may be a particular color.

In frame 204, remote user one has entered an invalid answer to question one. System 100 responds by displaying an "INVALID ANSWER" indication 228. The INVALID ANSWER indication 228 may be any suitable visible indication to user. As shown in frame 204, indication 228 may be an X flashed in first portion 136 of section 134A. In a particular embodiment, indication 228 may be associated with a color, such as red.

After INVALID ANSWER indication 228 has been displayed, the display reverts to its initial state, as shown in frame 206. It is also possible for INVALID ANSWER indication 228 to remain on the screen until a valid answer has been entered. Next, frame 208 shows that remote user two has entered a valid answer to question one. In response, display flashes a "VALID ANSWER" indication 230, for example, the color blue, which indicates that a valid answer to question one has been given. Since a valid answer to question one has been given, the question identifier 142 for remote user two in second portion 138 increments to the next question as shown in frame 210.

FIG. 2B shows an example of remote users one and two returning to a previous question (question one) for which each has already submitted a valid response. As shown in frame 212, first portions 136 of section 134A and 134B display an "ANSWERED" indication 232. This indicates to a user that the current question has already been answered. In a particular embodiment, ANSWERED indication 232 takes the same form as VALID ANSWER indication 230, but they can equally well take different forms.

Frame 214 shows remote user one changing a previous answer to question one. First portion 136 of section 134A displays a "CHANGED ANSWER" indication 234, indicating that remote user one has changed the previous answer. CHANGED ANSWER 234 indication may be a color, such as yellow. Since a valid answer to question one has been received, the question number 142 in second portion 138 of section 134A increments to the next question, as shown in frame 216. Since remote user one has not answered question two, ANSWERED indication 232 is not present in first portion 136 of section 134A. Remote user two is still on question one, so first portion 136 of section 134B displays ANSWERED indication 232.

In frame 218, remote user two confirms the previous answer to question one. First portion 136 of section 134B displays a "SAME ANSWER" indication 236. SAME ANSWER indication 236 may be a color different from CHANGED ANSWER indication 234, for example, green. After the confirmed answer has been received, question number 142 in second portion 136 of section 134B increments for remote user two, as shown in frame 220.

FIG. 2C shows an example of one of the remote users completing a three question examination. Frame 222 shows that remote user one is on the last question of the examination, indicated by question number three displayed in second portion 138 of section 134A. In frame 224, remote user one submits a valid answer to question three, as indicated by VALID ANSWER indication 230 in first portion 136 of section 134A.

Frame 226 then shows a display indicating that the examination has been completed. Because question three was the last question in the sequence, question number one is displayed in second portion 138 of section 134A, indicating that the examination is completed and remote user has returned to the beginning of the examination. Second portion 138 also displays an "ALL ANSWERED" indication 238, indicating that remote user one has submitted a valid answer to all questions. "ALL ANSWERED" indication 238 may include a color. In a particular embodiment, the color of ALL ANSWERED indication 238 is the same as the color used for VALID ANSWER indication 230 and ANSWERED indication 232. This has the advantage of associating a color with validly responding to questions. Since all questions have been answered including the current question, the ANSWERED indication 232 is displayed in first portion 136 of section 134A.

FIG. 3 illustrates response table 300 stored in memory 104 of system 100 that includes an identifier column 302 of identifiers 140 for remote units 110. Response column 304 shows the current response to a current question received from remote unit 110. Question matrix 306 includes stored answers submitted by each remote unit 110 for each question. Although question matrix 306 is shown one set of six questions for all of the users, alternative embodiments allow each user to respond to an individualized set of questions that may differ in number and/or content from the questions presented to other users. The "ALL ANSWERED" flag 308 indicates whether or not a particular remote user has submitted a valid response to all the questions in that user's examination, which, in this case, is a valid response to all six questions.

Each row 312 includes a pointer 310 in question matrix 306 shown as a shaded box, which indicates the current question to which the response from remote unit 110 applies. Questions for each remote unit 110 may be selected by updating pointer 310. System 100 may update pointer 310 in response to commands received from remote unit 110, and may automatically increment pointer 310 to the next question in the sequence once a valid answer has been received from the user of remote unit 110.

Row 312A shows that remote user one submits a response of "b" for question three (indicated by pointer 310A). The previously stored response for question three was "a". System 100 displays CHANGED ANSWER indication 234, stores the response for question three, and moves pointer 310A to question four. Since all questions have not yet been answered, there is no need to update ALL ANSWERED flag 308A.

Turning to row 312B, remote user two submits a response of "e" to question three. If answer choices a–d are valid answer choices for question three, system 100 displays INVALID ANSWER indication 228 to remote user two. Since no valid answer to question three was given, system 100 does not move pointer 310B to the next question and does not update ALL ANSWERED flag 308B.

Row 312C shows that remote user three submits a response of "d" to question six. Since remote user three has not submitted a previous answer to question six, system 100 displays a VALID ANSWER indication 230 to remote user three. Since question six is the end of the question sequence, pointer 310C returns to the beginning of the sequence at question one. Because the intervening questions in the sequence remain unanswered, system 100 does not update ALL ANSWERED flag 308C.

In row 312D, remote user four has already answered all questions. Thus, ALL ANSWERED flag 308D has the value "Yes," and ALL ANSWERED indication 238 is displayed by system 100. Remote user four submits the answer "c" for question four, and since this answer matches remote user's previous answer, system 100 displays SAME ANSWER indication 236 to remote user four.

Row 312E illustrates remote user five completing the set of questions. Remote user five enters the response "a," a valid response for question six. System 100 stores the response for question six and moves pointer 310E back to the beginning of the sequence. System 100 also displays VALID ANSWER indication 230 to remote user five. Since all of the questions have now been answered, ALL ANSWERED flag 308E is set to "Yes," and ALL ANSWERED indication 238 is displayed to user five.

Row 312F shows an example of remote user six moving from question to question. Remote user six's response to question three is a command, right arrow, corresponding to selecting the next question in the sequence. In response to the command, system 100 moves pointer 312F to the next question in the sequence. Since all of the questions have not yet been answered by remote user six, ALL ANSWERED flag 308F is not updated.

Figure 4B:
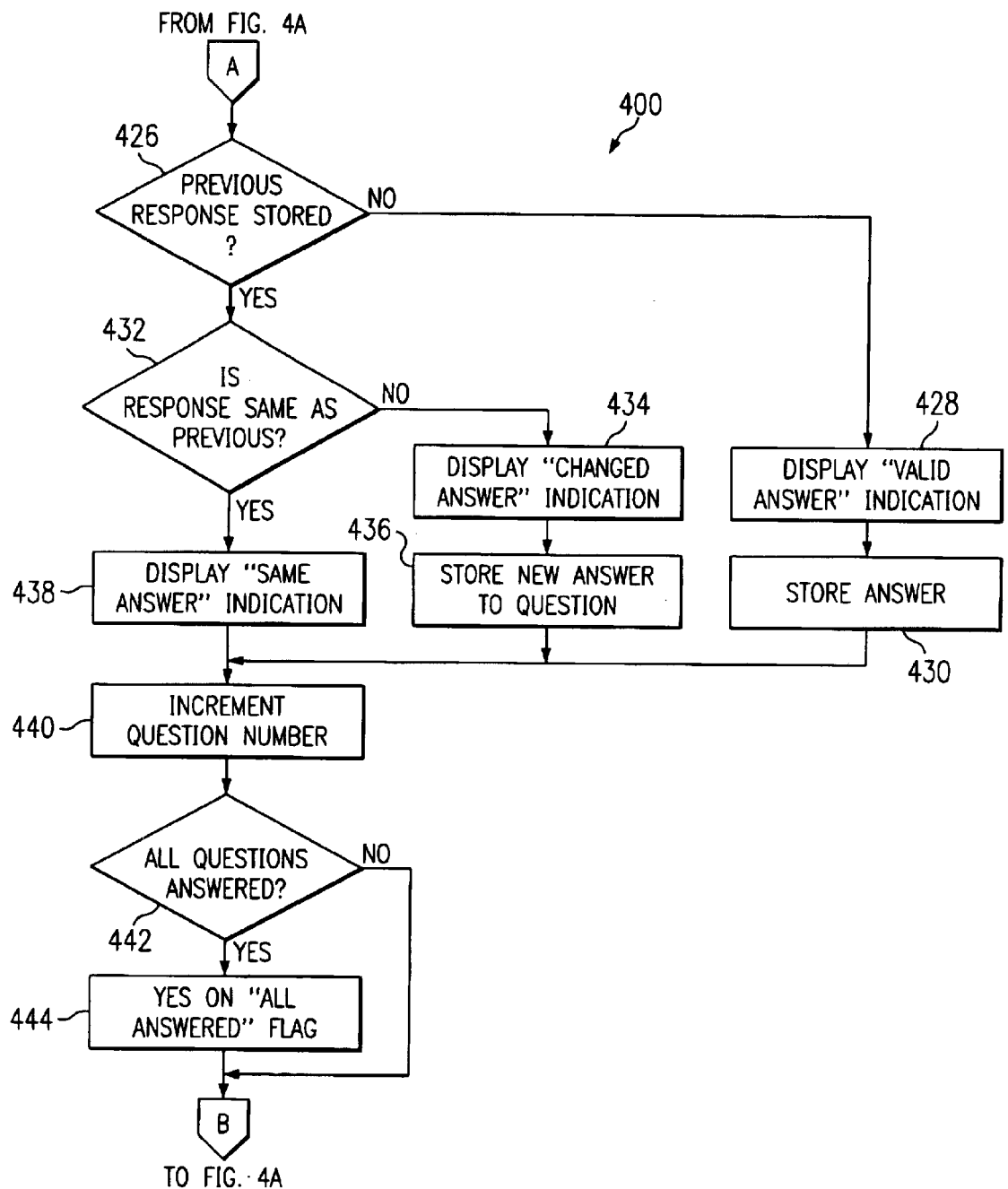
FIG. 4 is a flowchart illustrating a method for receiving responses from a remote unit.

FIG. 4 is a flowchart showing a method for receiving a message from remote units 110 and processing the message. System 100 displays a question number 142 for a current question 150 selected for the remote unit on display 106 at step 402. System 100 determines whether question 150 has been answered at step 404. If question 150 has been answered, then system 100 displays ANSWERED indication 232 on display 106 at step 406. At step 408, system 100 determines whether or not all questions 150 have been answered. If all questions 150 have been answered, system 100 displays "ALL ANSWERED" indication 238 on display 106 at step 410.

Base station 108 receives a response to the current question 150 from the remote unit at step 412. System 100 then determines whether the response is a command at step 414. If the response is a command, system 100 determines it the command is a direction command at step 416. A direction command is an instruction from the user of remote unit 110 to move to a new current question 150. If the command is a direction command, system 100 updates the question number 142 for the remote unit at step 420 in response to the command and returns to the beginning of flowchart 400. If the command is not a direction command, processor 102 takes action in response to the command at step 418. One example of such a command might be a command to cycle through the question numbers to indicate the number of questions 150 on the examination. Once the command is executed, system 100 prepares to receive another response at step 412.

If the response is not a command, system 100 determines whether the response is a valid answer at step 422. If the response is not a valid answer, system 100 displays INVALID ANSWER indication 228 on display 106 at step 424. System 100 then prepares to receive another response to the current question 150 at step 412.

If the response is a valid answer, system 100 checks to see whether there is a previous response stored at step 426. If no answer has been stored, system 100 displays a VALID ANSWER indication 230 on display 106 at step 428, and then stores the answer in memory 104 at step 430. If a previous response has been received, system 100 checks to see whether the current response corresponds to the previous response at step 432. If the responses do correspond, system 100 displays SAME ANSWER indication 236 at step 438. If the responses do not correspond, system 100 displays CHANGED ANSWER indication 234 at step 434, and system 100 then stores the new response to the current question 150 in memory 104 at step 436.

After a valid response has been received, system 100 increments question number 142 for remote unit 110 at step 440. To incrementing question number 142, system 100 moves to the next question 150 in the sequence, or if the sequence is complete, returns to the first question 150 in the sequence. System 100 determines if all of the questions 150 have been answered by remote unit 110 at step 442. If all of the questions 150 have been answered, system 100 updates the ALL ANSWERED flag 308 to "Yes" at step 444. After question number 142 and ALL ANSWERED flag 308 have been appropriately updated, system 100 returns to the beginning of flowchart 400.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for communicating in an education environment, comprising:

determining a current question from a plurality of questions, the current question having a plurality of possible answers;

receiving from one of a plurality of remote units a message comprising a remote unit identifier and a current response;

determining that the current response is valid if the current response corresponds to any of the possible answers for the current question;

if the current response is valid, visually indicating to a user of the remote unit that the current response is valid; and if the current response is not valid, visually indicating to the user of the remote unit that the current response is not valid;

wherein the user of the remote unit is allowed to progress through the questions independently with respect to users of other remote units by viewing a section of a common display, the section associated with the remote unit used by the user and the common display simultaneously viewable by all users of the remote units.

2. The method of claim 1, wherein the user of the remote unit is allowed to progress through the questions independently with respect to users of other remote units by viewing the section of the common display and without reference to visual feedback from the remote unit used by the user.

3. The method of claim 1, further comprising:

receiving a command from the remote unit; and determining a new current question from the questions in response to the command.

4. The method of claim 1, further comprising:

determining a current question for a second one of the remote units;

receiving a message comprising a current response and a remote unit identifier for the second remote unit;

determining that the current response of the second remote unit is valid if it corresponds to any of the possible answers to the current question.

5. The method of claim 1, wherein the message from the remote unit is communicated as a wireless signal.

6. The method of claim 1, further comprising:

determining that a valid response for each of the questions has been received from the remote unit; and visually indicating to a user that a valid response for each of the questions was received.

7. The method of claim 1, further comprising:

determining that a valid response for each of the questions has been received from the remote unit;

visually indicating to a user that a valid response for each of the questions was received;

comparing the complete set of valid responses to a set of correct answers to the questions; and determining a score for the complete set of valid responses.

8. The method of claim 1, wherein visually indicating that the current response is valid comprises:

displaying a first visible indication if the current response matches a previous valid response for the current question;

displaying a second visible indication if the current response does not match the previous valid response; and displaying a third visible indication if no previous valid response has been received from the remote unit.

9. The method of claim 8, wherein the first visible indication comprises a first color, the second visible indication comprises a second color, and the third visible indication comprises a third color.

10. The method of claim 1, wherein the questions are ordered in a sequence, the current response is a first current response, and the method further comprises:

determining a next question in the sequence, the next question having a plurality of possible answers;

visually indicating the next question to the user of the remote unit;

receiving a second current response to the next question from the remote unit;

determining that the second current response is valid if the second current response corresponds to any of the possible answers to the next question; and if the second current response is valid, visually indicating to the user of the remote unit that the second current response is valid; and if the second current response is not valid, visually indicating to the user of the remote unit that the second current response is not valid.

11. A graphical user interface, comprising:

a plurality of sections associated with a plurality of users, each section displaying a remote unit identifier identifying a remote unit operated by one of the users, each section comprising:

a first visible indication operable to be displayed in the section when a current response received from the remote unit corresponding to the section is not a valid response for a current question;

a second visible indication operable to be displayed in the section when the current response received from the remote unit is a valid response and the remote unit has not submitted a previous valid response to the current question;

a third visible indication operable to be displayed in the section when the current response from the remote unit is a valid response that matches a previous valid response; and a fourth visible indication operable to be displayed when the current response from the remote unit is a valid response different from a previous valid response.

12. The graphical user interface of claim 11, wherein the graphical user interface appears on a single display simultaneously viewable by all of the users of the remote units.

13. The graphical user interface of claim 11, wherein each section further comprises:
    a first portion displaying the remote unit identifier; and
    a second portion displaying a question identifier for the current question.

14. The graphical user interface of claim 13, wherein the second portion is further operable to display a new question identifier in response to a command from the remote unit.

15. The graphical user interface of claim 13, wherein each section further comprises a fifth visible indication operable to be displayed in the section when a valid response to each of a plurality of questions has been received from the remote unit of the section.

16. The graphical user interface of claim 11, wherein the first visible indication is a first color, the second visible indication is a second color, the third visible indication is a third color, and the fourth visible indication is a fourth color.

17. A communication system, comprising:
    a plurality of remote units;
    a memory operable to store a plurality of possible answers to a plurality of questions;
    a base station operable to receive messages from the remote units, each message comprising a remote unit identifier and a current response;
    a processor operable to determine for each message a current question using the remote unit identifier, the processor further operable to determine that the current response is valid if the current response corresponds to any of the possible answers for the current question; and
    a common display simultaneously viewable by all users of the remote units and operable to visually indicate to the users whether their respective current responses are valid;
    wherein a user of a selected remote unit is allowed to progress through the questions independently with respect to users of other remote units by viewing a section of the common display, the section associated with the selected remote unit used by the user.

18. The communication system of claim 17, wherein the base station is operable to receive messages communicated as wireless signals.

19. The communication system of claim 17, wherein the base station is operable to receive a first message from one of the remote units and to reject subsequent messages for a specified duration after the first message is received.

20. The communication system of claim 17, wherein the processor is further operable to change the current question for one of the remote units.

21. The communication system of claim 17, wherein the processor is further operable to determine whether a valid response has been received previously from the remote unit, and the common display is further operable to:
    display a first visible indication if no previous valid response has been received;
    display a second visible indication if the current response matches the previous valid response; and
    display a third visible indication if the current response is different from a previous valid response.

22. The communication system of claim 17, wherein the processor is further operable to:
    determine if a valid response to each questions has been received from each of the remote units;
    compare each valid response to a question to a correct answer for the question; and
    determine a score for each remote unit based on the valid responses submitted by that remote unit.

23. The communication system of claim 17, wherein the user of the selected remote unit is allowed to progress through the questions independently with respect to the users of other remote units by viewing the section of the common display and without reference to visual feedback from the selected remote unit.

24. A method for communicating in an education environment, comprising:
    displaying a plurality of sections on a common display simultaneously viewable by all of the users of the remote units, each one of the sections associated with one of a plurality of remote units;
    receiving from a selected remote unit a message comprising a remote unit identifier for the selected remote unit and a current response to a question, the question having a plurality of possible responses; and
    in response to receiving the current response from the selected remote unit, displaying a visual indication in the section corresponding to the selected remote unit, the visual indication indicating whether the current response corresponds to a previous response to the question received from the selected remote unit;
    wherein a user of the selected remote unit is allowed to progress through a plurality of questions independently with respect to users of other remote units by viewing the section of the common display associated with the selected remote unit used by the user.

25. The method of claim 24, wherein the user of the selected remote unit is allowed to progress through the questions independently with respect to the users of other remote units by viewing the section of the common display associated with the selected remote unit used by the user and without reference to visual feedback from the selected remote unit.

26. The method of claim 24, further comprising displaying the remote unit identifier for each remote unit in the corresponding section of the common display.

27. The method of claim 25, wherein the visual indication comprises flashing the remote unit identifier in a particular color.

28. The method of claim 24, further comprising:
    determining whether the current response corresponds to any of the possible answers to the question; and
    if the current response does not correspond to any of the possible answers, indicating with the visual indication that the current response does not correspond to any of the possible answers.

29. The method of claim 24, wherein:
    the message is received from the selected remote unit wirelessly; and
    subsequent messages from the selected remote unit are disregarded for a predetermined amount of time after the current message is received.

30. The method of claim 24, wherein a different question may be associated with each remote unit, and the method further comprises determining the question associated with the selected remote unit.

31. A communications system, comprising:
- a memory operable to store a question and a plurality of possible answers to the question;
- a common display comprising a plurality of sections, each one of the sections associated with one of a plurality of remote units, wherein the common display is simultaneously viewable by users of the remote units;
- a base station operable to receive, from a selected remote unit, a message comprising a remote unit identifier and a current response to the question and further operable to store the current response in the memory; and
- a processor operable to determine, based on information stored in the memory, whether the current response received from the selected remote unit corresponds to a previous response received from the selected remote unit and further operable to display a visual indication on the common display in the section corresponding to the remote unit indicating whether the current response corresponds to the previous response;
- wherein a user of the selected remote unit is allowed to progress through a plurality of questions independently with respect to users of other remote units by viewing the section of the common display associated with the selected remote unit used by the user.

32. The system of claim 31, wherein the user of the selected remote unit is allowed to progress through the questions independently with respect to the users of other remote units by viewing the section of the common display associated with the selected remote unit used by the user and without reference to visual feedback from the selected remote unit.

33. The system of claim 31, further comprising displaying the remote unit identifier for each remote unit in the corresponding section of the common display.

34. The system of claim 33, wherein the visual indication comprises flashing the remote unit identifier in a particular color.

35. The system of claim 31, wherein the processor is further operable to:
- determine whether the current response corresponds to any of the possible answers to the question; and
- if the current response does not correspond to any of the possible answers, indicate with the visual indication that the current response does not correspond to any of the possible answers.

36. The system of claim 31, wherein:
- the message is received from the one remote unit wirelessly; and
- subsequent messages from the one remote unit are disregarded for a predetermined amount of time after the current message is received.

37. The system of claim 31, wherein a different question may be associated with each remote unit, and the processor is further operable to determine the question associated with the selected remote unit.

38. A graphical user interface, comprising:
- a plurality of sections on a common display simultaneously viewable by users of a plurality of remote units, each section corresponding to one of the remote units, each section displaying:
  - a first portion displaying a remote unit identifier identifying the remote unit corresponding to the section; and
  - a second portion displaying a question identifier identifying a particular one of a plurality of questions; and
- a visual indication operable to be displayed in a selected section of the common display when a message is received by a base station from a selected remote unit corresponding to the selected section, wherein the message comprises a response to the question identified by the question identifier and a user of the selected remote unit is allowed to progress through a plurality of questions independently with respect to users of other remote units by viewing the section of the common display associated with the selected remote unit used by the user.

39. The graphical user interface of claim 38, wherein the user of the selected remote unit is allowed to progress through the questions independently with respect to the users of other remote units by viewing the section of the common display associated with the selected remote unit used by the user and without reference to visual feedback from the selected remote unit.

40. The graphical user interface of claim 38, wherein the second portion is further operable to display a new question identifier in response to a command from the remote unit.

41. The graphical user interface of claim 38, wherein the visual indication indicates whether the response corresponds to a previous response received from the selected remote unit.

* * * * *